3,787,498
PROCESS FOR PREPARING 3'-OXO-RETINENE

Jacques Morel, Choisy-le-Roi, France, assignor to Rhone-Poulenc S.A., Paris, France
No Drawing. Filed Dec. 29, 1970, Ser. No. 102,557
Claims priority, application France, Dec. 31, 1969, 6945665
Int. Cl. C07c 47/42
U.S. Cl. 260—586 B                  7 Claims

ABSTRACT OF THE DISCLOSURE

3'-oxo-retinene, which can be converted into canthaxanthine useful as a coloring agent for foods, is made by oxidizing retinene with a meta-periodate in the presence of, as catalyst, a halogen or a metal oxide of Group V-A, VI-A, VII-A, or VIII of the Periodic Table.

---

The present invention provides a process for preparing 3'-oxo-retinene which comprises contacting one molecular proportion of retinene with at least four molecular proportions of ammonium or an alkali metal metaperiodate, in a diluent and in the presence of, as catalyst, a halogen or of an oxide of a metal of the Groups V-A, VI-A, VII-A and VIII of the Periodic Table of the Elements of the Societe Chimique de France.

The diluents employed are inert under the working conditions and are capable of being removed from the reaction medium at a temperature not above about 60° C., to avoid thermal degradation of the 3'-oxo-retinene.

The meta-periodate, e.g. sodium meta-periodate is preferably added dissolved in a solvent, such as water, which is inert to the reactants. Suitable solvents for the retinene are inert water-immiscible organic solvents such as chlorinated aliphatic hydrocarbons having a small number of carbon atoms (1 or 2) and lower aliphatic ethers.

Suitable metal oxide catalysts are tungsten trioxide, vanadium pentoxide, molybdenum trioxide and osmium tetroxide. These metal oxides are either added as such, or as solutions. Solvents which are inert under the reaction conditions and which can be removed at a temperature not exceeding about 60° C., e.g. halogenated or non-halogenated aliphatic hydrocarbons, aromatic hydrocarbons such as benzene, esters and aliphatic ethers, and water, can be used.

Iodine, either as such, as a solution, or prepared in situ, is the preferred halogen catalyst but bromine and chlorine can also be used. To produce iodine in situ, it is sufficient to add some hydriodic acid or an iodide to the metaperiodate, in order to liberate iodine.

These catalysts can be used in a proportion of 0.1% to 10%, preferably 0.5 to 5%, by weight, of the retinene to be oxidized.

The concentration of the retinene in the reaction medium can vary within fairly wide limits.

However, the best results are obtained with 0.1 to 3% preferably 0.4 to 0.9%, by weight of retinene per volume of the reaction medium.

The oxidation temperature is preferably fairly low, of the order of −5° to +25° C., and especially 0 to 5° C. The reaction yield can be improved by adding a small proportion of a volatile alcohol, e.g. a lower alkanol, such as ethanol. In general it is advantageous to introduce at most 2% by volume of ethanol to obtain the maximum improvement.

The end of the reaction, i.e. when all the retinene has been oxidized, is detected by thin layer chromatography. This procedure is carried out by placing about two microlitres of reaction mixture on a silica gel layer of 250μ thickness, using a petroleum ether (boiling point=40–65° C.)/benzene/ethanol mixture having a volume composition of 50/50/5, as solvent. The reaction is considered to be complete when the chromatogram shows substantially only one spot, the $R_f$ of which is identical to that of 3'-oxo-retinene, and no longer shows a spot corresponding to retinene itself.

When the end of the reaction has been reached it is preferable to add an alkaline reagent, such as sodium carbonate, to prevent side-reactions from developing.

3'-oxo-retinene can be isolated from the reaction mass by reaction with p-nitrophenylhydrazide. The derivative obtained can be easily purified by crystallization and pure 3'-oxo-retinene can be easily regenerated therefrom.

3'-oxo-retinene is an intermediate for the preparation of canthaxanthine, by, for example, the process described, in French Pat. No. 1,284,478. Canthaxanthine is useful as a coloring agent for foodstuffs.

The following examples illustrate the invention.

EXAMPLE 1

A solution of 0.2 g. of retinene in 20 cm.$^3$ of chloroform is introduced into a 50 cm.$^3$ volume flask provided with a stirrer and a reflux condenser, and then cooled to 0° C. 0.5 g. of sodium meta-periodate dissolved in 3 cm.$^3$ of water, followed by 5 cm.$^3$ of chloroform containing 5 mg. of iodine, are added while stirring. 1 g. of meta-periodate in 6 cm.$^3$ of water is added after 2 hours 30 minutes, 5 cm.$^3$ of a chloroform solution containing 0.1% of iodine, and another 0.5 g. of meta-periodate in 3 cm.$^3$ of water, are added after 20 hours. The reaction temperature is kept at 0–2° C. for 2 hours, and then at 22° C. during the remainder of the operation until the retinene has completely disappeared.

7 g. of anhydrous sodium carbonate are next added, and the reaction mixture is filtered and washed 3 times, with 40 cm.$^3$ of chloroform each time, concentrated by heating at 40° C. in vacuo, and then diluted with ethanol in a standard flask to a volume of 50 cm.$^3$.

0.156 g. of 3'-oxo-retinene are found in this solution by optical density measurement determination at wavelengths 380 m$\mu$ and 297 m$\mu$.

EXAMPLE 2

0.2 g. of retinene dissolved in 20 cm.$^3$ of diethyl ether and 0.4 g. of sodium meta-periodate dissolved in 3 cm.$^3$ of water, followed by 5 cm.$^3$ of chloroform containing 5 mg. of iodine, are mixed in an apparatus identical to that of the preceding example, and under the same conditions. The reaction is allowed to proceed, while adding in succession:

after 4 hours: 0.5 g. of meta-periodate in 4 cm.$^3$ of water
after 6 hours: 2 cm.$^3$ of a chloroform solution containing 0.1% of iodine
after 21 hours: 2 cm.$^3$ of a chloroform solution containing 0.1% of iodine
after 21 hours 45 minutes: 1 g. of meta-periodate in 8 cm.$^3$ of water.

When oxidation is finished, 0.167 g. of 3'-oxo-retinene are determined in the reaction mass. The yield is 79.9%.

I claim:
1. Process for preparing 3'-oxo-retinene which comprises contacting at −5° to +25° C. one molecular proportion of retinene dissolved in an inert, organic, water-immiscible solvent with at least four molecular proportions of ammonium or an alkali metal metaperiodate dissolved in water and in the presence of a catalytic quantity of chlorine, bromine, or iodine, the initial concentration of the retinene being from 0.1 to 3% of the reaction medium, expressed in weight for volume.
2. Process according to claim 1 in which the catalyst is bromine or iodine.

3. Process according to claim 1 in which the initial concentration of the retinene is from 0.4 to 0.9% weight for volume.

4. Process according to claim 1 in which the meta-periodate is sodium periodate.

5. Process according to claim 1 in which the proportion of catalyst is 0.1 to 10% by weight of the retinene.

6. Process according to claim 5 in which the proportion is 0.5 to 5% by weight.

7. Process according to claim 1 in which the oxidation is effected in the presence of up to 2%, by volume of the reaction mixture, of a lower alkanol.

References Cited

UNITED STATES PATENTS

| | | | |
|---|---|---|---|
| 2,662,921 | 12/1953 | Middleton | 260—586 B X |
| 2,643,269 | 6/1953 | Augustine | 260—586 B X |
| 2,879,300 | 3/1959 | Cheney et al. | 260—586 B X |
| 3,076,032 | 1/1963 | Riemenschneider et al. | 260—586 B X |
| 3,080,425 | 3/1963 | Smidt et al. | 260—586 B |
| 2,223,494 | 12/1940 | Loder | 260—586 B |
| 3,057,915 | 10/1962 | Riemenschneider et al. | 260—586 B X |

LEON ZITVER, Primary Examiner

N. MORGENSTERN, Assistant Examiner